United States Patent
Aston et al.

(10) Patent No.: US 11,274,722 B2
(45) Date of Patent: Mar. 15, 2022

(54) DAMPING APPARATUS AND ASSOCIATED SYSTEMS AND METHODS FOR DAMPING A FIRST MEMBER RELATIVE TO A SECOND MEMBER

(71) Applicant: The Boeing Company, Chicago, IL (US)

(72) Inventors: Richard W. Aston, Brea, CA (US); Michael J. Langmack, Huntington Beach, CA (US); Matthew J. Herrmann, Rancho Palos, CA (US)

(73) Assignee: The Boeing Company, Chicago, IL (US)

( * ) Notice: Subject to any disclaimer, the term of this patent is extended or adjusted under 35 U.S.C. 154(b) by 301 days.

(21) Appl. No.: 16/520,586

(22) Filed: Jul. 24, 2019

(65) Prior Publication Data

US 2021/0025468 A1   Jan. 28, 2021

(51) Int. Cl.
| | |
|---|---|
| *F16F 3/08* | (2006.01) |
| *F16F 3/087* | (2006.01) |
| *B64F 5/10* | (2017.01) |
| *B64F 5/40* | (2017.01) |

(52) U.S. Cl.
CPC .............. *F16F 3/0873* (2013.01); *B64F 5/10* (2017.01); *B64F 5/40* (2017.01); *F16F 2224/0208* (2013.01); *F16F 2226/04* (2013.01)

(58) Field of Classification Search
CPC ............. F15F 1/38; F15F 15/08; F15F 3/0873
See application file for complete search history.

(56) References Cited

U.S. PATENT DOCUMENTS

| | | | |
|---|---|---|---|
| 4,213,718 A | 7/1980 | Lumby | |
| 5,286,014 A * | 2/1994 | Chakko | F16F 7/06 267/293 |
| 2008/0196987 A1* | 8/2008 | Niwa | F16F 1/3828 188/379 |
| 2014/0339749 A1* | 11/2014 | Saito | F16F 1/3814 267/141.1 |
| 2019/0128320 A1* | 5/2019 | Cox | F16C 27/06 |

FOREIGN PATENT DOCUMENTS

| | | | |
|---|---|---|---|
| CN | 105736685 A * | 7/2016 | |
| CN | 107816502 A * | 3/2018 | |
| CN | 109083956 A * | 12/2018 | B61C 9/50 |
| CN | 109667866 A * | 4/2019 | |
| EP | 1467121 | 10/2004 | |
| EP | 2 180 203 | 4/2010 | |
| KR | 20170142042 A * | 12/2017 | |
| RU | 186496 U1 * | 1/2019 | |
| WO | WO 97/12160 | 4/1997 | |
| WO | WO-2006024426 A2 * | 3/2006 | F16F 1/38 |

OTHER PUBLICATIONS

European Patent Office, "Extended European Search Report," App. No. 20179520.0 (dated Dec. 4, 2020).

* cited by examiner

*Primary Examiner* — Melanie Torres Williams
(74) *Attorney, Agent, or Firm* — Walters & Wasylyna LLC

(57) ABSTRACT

An apparatus for damping a first member relative to a second member. The apparatus includes a receiving member that includes a flange, an axial elastomeric member, and a radial elastomeric member. The axial elastomeric member is positionable between a surface of the first member and the flange of the receiving member, and the radial elastomeric member is positionable between the first member and the receiving member.

20 Claims, 8 Drawing Sheets

DAMPING APPARATUS AND ASSOCIATED SYSTEMS AND METHODS FOR DAMPING A FIRST MEMBER RELATIVE TO A SECOND MEMBER

FIELD

This application relates to mechanical energy damping and, more particularly, to methods, systems and apparatus for damping a first member relative to a second member.

BACKGROUND

Within various industries, it may be desired (or even necessary) to attenuate shock and/or vibrations transmitted from a supporting structure to a piece of functional equipment. Shock loads are typically large magnitude, short duration forces. Shock loads may have vibration frequencies ranging from a few hertz to many kilohertz or more, may be transient or continuing in nature, and may have axial and/or lateral directional components.

In the aerospace industry, there is a need to prevent substantial mechanical vibrations and/or mechanical shocks generated during operation of an aerospace vehicle (e.g., an aircraft, spacecraft, satellite, rocket, etc.) from reaching functional equipment mounted to a supporting structure of the vehicle. If a sufficient shock load is transmitted to the functional equipment, mechanical vibrations and/or mechanical shocks may damage the functional equipment or cause the functional equipment to fail. Furthermore, space and weight constraints of aerospace vehicles, as well as the need for a high degree of flexibility for strength and load-attenuation requirements, may limit use of existing shock attenuation methods.

Accordingly, those skilled in the art continue with research and development efforts in the field of mechanical energy damping.

SUMMARY

Disclosed are apparatus, systems and methods for damping a first member relative to a second member.

In one example, the disclosed apparatus for damping includes a receiving member that includes a flange, an axial elastomeric member, and a radial elastomeric member. The axial elastomeric member is positionable between a surface of the first member and the flange of the receiving member, and the radial elastomeric member is positionable between the first member and the receiving member.

In another example, the disclosed apparatus for damping includes a receiving member, a first axial elastomeric member, a second axial elastomeric member, and a radial elastomeric member. The first member includes a first surface, a second surface opposed from the first surface, and a first member through-bore extending between the first surface and the second surface. The receiving member includes a shaft that is configured to extend through the first member through-bore, the shaft defining a shaft through-bore that extends along a shaft through-bore axis, as well as a first end portion and a second end portion opposed from the first end portion. The receiving member further includes a first flange proximate the first end portion and a second flange proximate the second end portion. The first axial elastomeric member is positionable between the first surface of the first member and the first flange of the receiving member. The second axial elastomeric member is positionable between the second surface of the first member and the second flange of the receiving member. The radial elastomeric member is positionable within the first member through-bore between the first member and the shaft of the receiving member.

In one example, the disclosed damping system includes a first member that includes a first surface, a second surface opposed from the first surface, and a first member through-bore extending between the first surface and the second surface. The damping system also includes a receiving member, a first axial elastomeric member, a second axial elastomeric member, a radial elastomeric member, and a second member. The receiving member includes a shaft that is configured to extend through the first member through-bore, the shaft defining a shaft through-bore that extends along a shaft through-bore axis, as well as a first end portion and a second end portion opposed from the first end portion. The receiving member further includes a first flange proximate the first end portion and a second flange proximate the second end portion. The first axial elastomeric member is positionable between the first surface of the first member and the first flange of the receiving member. The second axial elastomeric member is positionable between the second surface of the first member and the second flange of the receiving member. The radial elastomeric member is positionable within the first member through-bore between the first member and the shaft of the receiving member. The second member is at least partially received within the shaft through-bore of the receiving member.

In one example, the disclosed method for damping a first member relative to a second member includes positioning a receiving member that includes a shaft through-bore within the first member through-bore, positioning at least one elastomeric member between the receiving member and the first member, and positioning the second member within the shaft through-bore. The first member includes a first surface, a second surface opposed from the first surface, and a first member through-bore extending between the first surface and the second surface.

Other examples of the disclosed apparatus, systems and methods will become apparent from the following detailed description, the accompanying drawings and the appended claims.

DETAILED DESCRIPTION

Figure 1:
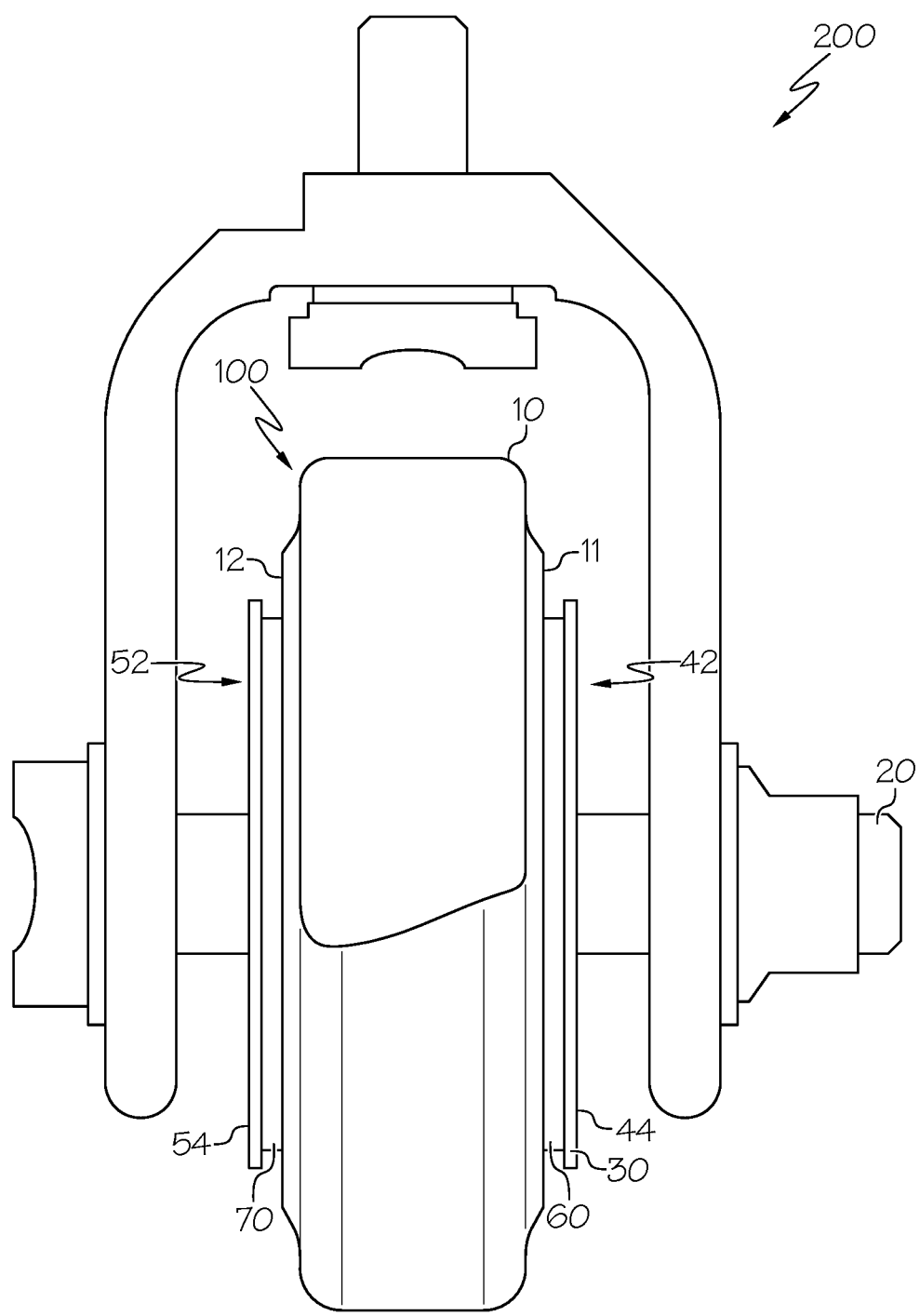
FIG. 1 is a front view of an example of the disclosed damping system.
Figure 2:
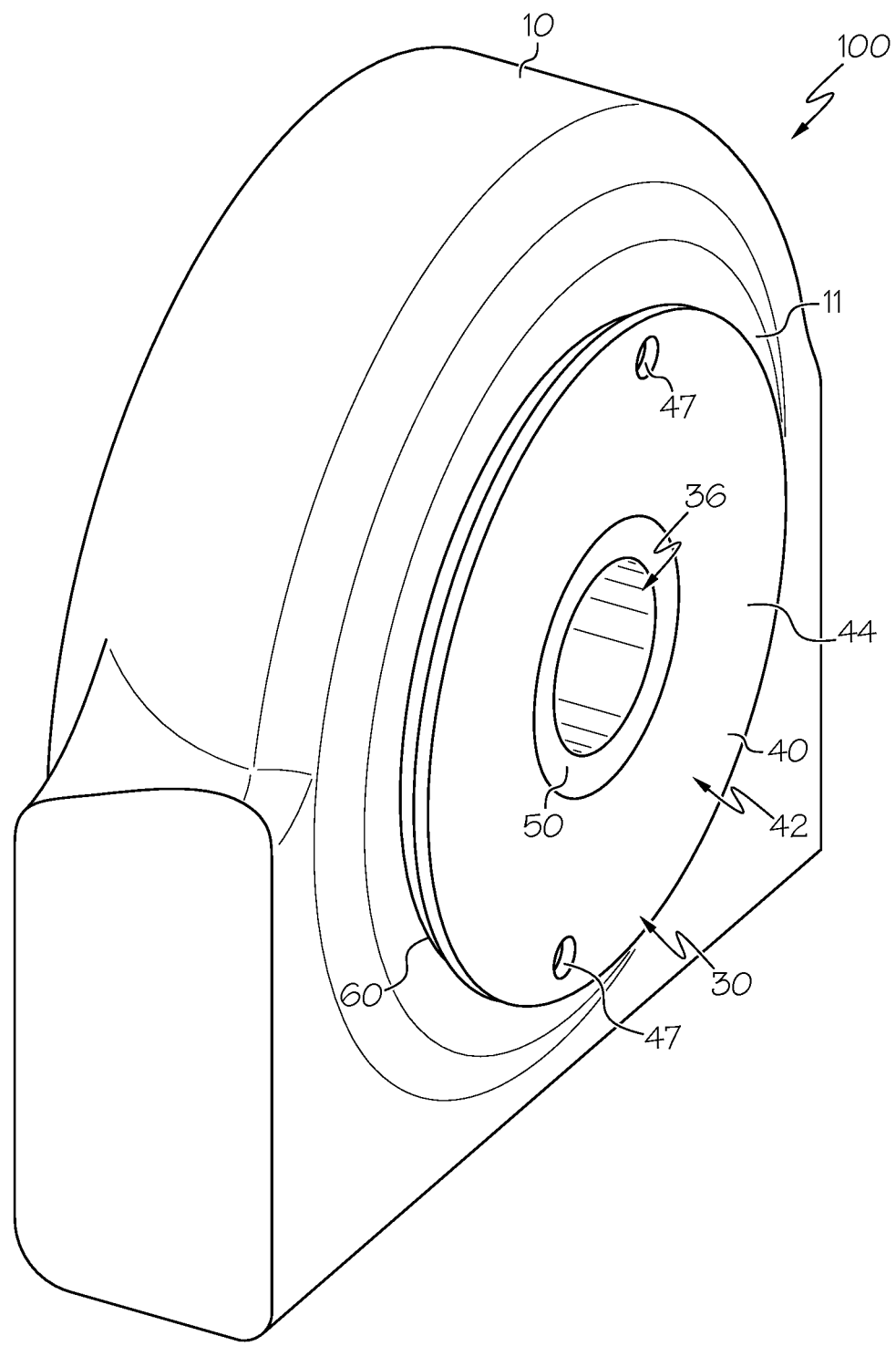
FIG. 2 is a perspective view of the apparatus for damping of the damping system shown in FIG. 1.

The following detailed description refers to the accompanying drawings, which illustrate specific examples described by the disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic and/or operational step described in connection with the example is included in at least one embodiment and/or implementation of the subject matter according to the present disclosure. Thus, the phrase "an example" and similar language throughout the present disclosure may, but do not necessarily, refer to the same example. Further, the subject matter characterizing any one example may, but does not necessarily, include the subject matter characterizing any other example.

As used herein, the phrase "a number of" items means one or more of those items. For example, a number of items may include one item or a plurality of items. For the purpose of simplicity, throughout the present disclosure and unless otherwise indicated, use of the plural form of the referred to item means the number of items. For example, unless otherwise indicated, use of "items" means "the number of items."

Referring to FIG. 1, the present disclosure provides examples of a damping system 200 for damping the movement of a first member 10 relative to a second member 20. The damping system 200 includes a first member 10, a second member 20, and a damping apparatus 100 for damping the first member 10 relative to the second member 20. Although the first member 10 and the second member 20 are shown as being a housing and a bolt, the first member 10 and the second member 20 may be any suitable combination of devices, structures, components and the like. The damping apparatus 100 may damp the intermobility of the first member 10 relative to the second member 20 such that significantly less mechanical energy is transferred between the two. In doing so, the damping apparatus 100 significantly affixes their positions relative to one another.

The first member 10 and the second member 20 may be made from various materials, such as aluminum, titanium and the like. The first member 10 may be a monolithic structure or an assembly of smaller components. Similarly, the second member 20 may be a monolithic structure or assemblies of smaller components.

Referring to FIGS. 2-6, disclosed is an example of a damping apparatus 100 for damping a first member 10 relative to a second member 20 of damping system 200. Here, the first member 10 includes a first surface 11, a second surface 12 opposed from the first surface 11, and a first member through-bore 13 extending between the first surface 11 and the second surface 12. The damping apparatus 100 includes a receiving member 30, a first axial elastomeric member 60, a second axial elastomeric member 70 and a radial elastomeric member 80. The first axial elastomeric member 60 is positionable between the first surface 11 of the first member 10 and the first flange 44 of the receiving member 30. The second axial elastomeric member 70 is positionable between the second surface 12 of the first member 10 and the second flange 54 of the receiving member 30. The radial elastomeric member 80 is positionable within the first member through-bore 13 between the first member 10 and the shaft 32 of the receiving member 30.

The receiving member 30 includes a shaft 32 that extends through the first member through-bore 13. The shaft 32 defines a shaft through-bore 34 extending along a shaft through-bore axis A. The shaft 32 also includes a first end portion 42, a first flange 44 proximate the first end portion 42, a second end portion 52 axially opposed from the first end portion 42, and a second flange 54 proximate the second end portion 52. At least one of the first flange 44 and the second flange 54 may be connected to the shaft 32 by a suitable mechanism for connecting, such as adhesion, swaging, and the like. As shown, the first flange 44 and the second flange 54 are integral with the shaft of the receiving member 30.

The receiving member 30 may at least partially receive the second member 20. By connecting the second member 20 to the receiving member 30 (such as by inserting the second member through the shaft through-bore of the receiving member), mechanical loads may be transferred between the second member 20 and the receiving member 30. Those skilled in the art will appreciate however, that the efficiency of mechanical load transfer is related to the degree in which the second member 20 is in contact with the receiving member 30. The tighter the connection between the receiving member 30 and the second member 20, the more efficient the transfer of mechanical loads between the two may be. Further, a variety of other mechanisms (such as a ball joint type connection) may be employed to connect the second member 20 to the receiving member 30 without departing from the scope of the present disclosure.

The receiving member 30 may be made from any suitable material such as titanium, aluminum and the like. Further, the receiving member 30 may be a single monolithic piece or an assembly of smaller components. In the example illustrated in FIGS. 4-6, the receiving member 30 includes a first receiving member portion 40 and a second receiving member portion 50. The first receiving member portion 40 includes a first flange 44 and a portion of the receiving member shaft 32. The second receiving member portion 50 includes a second flange 54 and another portion of the receiving member shaft 32. Those skilled in the art will appreciate that it may be easier to maneuver the receiving member 30 in and out of the first member through-bore 13 if the receiving member 30 was an assembly of several pieces, as opposed to being a single monolithic piece.

The first receiving member portion 40 may be releasably connected to the second receiving member portion 50. The mechanism by which the first and second receiving member portions 40, 50 are releasably connected may include any suitable mechanism or combination of mechanisms for connecting. In one example, the first receiving member portion 40 may include first threads 46 and the second receiving member portion 50 may include second threads 56 that correspond to the first threads 46. In this example, the first receiving member portion 40 may be in threaded engagement with the second receiving member portion 50. In another example, the first receiving member portion 40 may be adhered to the second receiving member portion 50 in addition to being in threaded engagement. In yet another example, the first receiving member portion 40 may be mechanically deformed (e.g., swaged) around the second receiving member portion 50. Those skilled in the art will appreciate that other connection mechanisms or combinations of connection mechanisms may be employed without departing from the scope of the present disclosure.

Before the first receiving member portion 40 and the second receiving member portion 50 are releasably connected to one another, however, a shim 36 may be positioned between the first receiving member portion 40 and the second receiving member portion 50. More specifically, the first receiving member portion 40 may include a first interior surface 48 and the second receiving member portion 50 may include a second interior surface 58. When the first receiving member portion 40 is threaded onto the second receiving member portion 50, the first and second receiving member portions 40, 50 may define a gap 38 therebetween that corresponds to the space between the first interior surface 48 and the second interior surface 58. If used, a shim 36 may be positioned within this gap 38 such that, even when threaded to the maximum extent possible, the first receiving member portion 40 is spaced a predefined minimum distance $D_3$ apart from the second receiving member portion 50. Those skilled in the art will appreciate that when a first axial elastomeric member 60 and/or a second axial elastomeric 70 is positioned between their respective surfaces of the first member 10 and flanges of the receiving member 30, that predefining a minimum distance $D_3$ apart enables an operator to control the degree of clearance between those parts. Threading the first receiving member 40 onto the second receiving member portion 50 may, in an example, compress the first axial elastomeric member 60 between the first flange 44 and the first surface 11 of the first member 10, as well as the second axial elastomeric member 70 between the second flange 54 and the second surface 12 of the first member 10. Those skilled in the art will also appreciate that compressing an elastomeric material may alter the physical properties of that elastomeric material (such as by increasing stiffness). Positioning a shim 36 between the first and second receiving member portions 40, 50 may enable an operator to control the degree to which the first axial elastomeric member 60 and/or the second axial elastomeric member 70 are compressed. Positioning a shim 36 between the first and second receiving member portions 40, 50 may also enable an operator to prevent the first and second axial elastomeric members 60, 70 from being compressed until failure.

The receiving member 30 may also include torquing features. Those skilled in the art will appreciate that torquing features may be particularly useful in, but not limited to, examples of the damping apparatus 100 that include a first receiving member portion 40 in threaded engagement with a second receiving member portion 50 (such as the example illustrated in FIGS. 1-6) because the torquing features may facilitate the threading of the first receiving member portion 40 onto the second receiving member portion 50. As shown, the first flange 44 of the first receiving member portion 40 includes a first torquing feature 47 and the second flange 54 of the second receiving member portion 50 includes a second torquing feature 57. The first torquing feature 47 may rotate the first receiving member portion 40 about shaft through-bore axis A and the second torquing feature 57 may rotate the second receiving member portion 50 about shaft through-bore axis A. The first and second torquing features 47, 57 include a plurality of divots that may correspond to an appropriate spanner wrench. Those skilled in the art will appreciate however, that any suitable mechanism for rotating the receiving member 30 (or any component thereof) may be employed without departing from the scope of the present disclosure.

Figure 3:
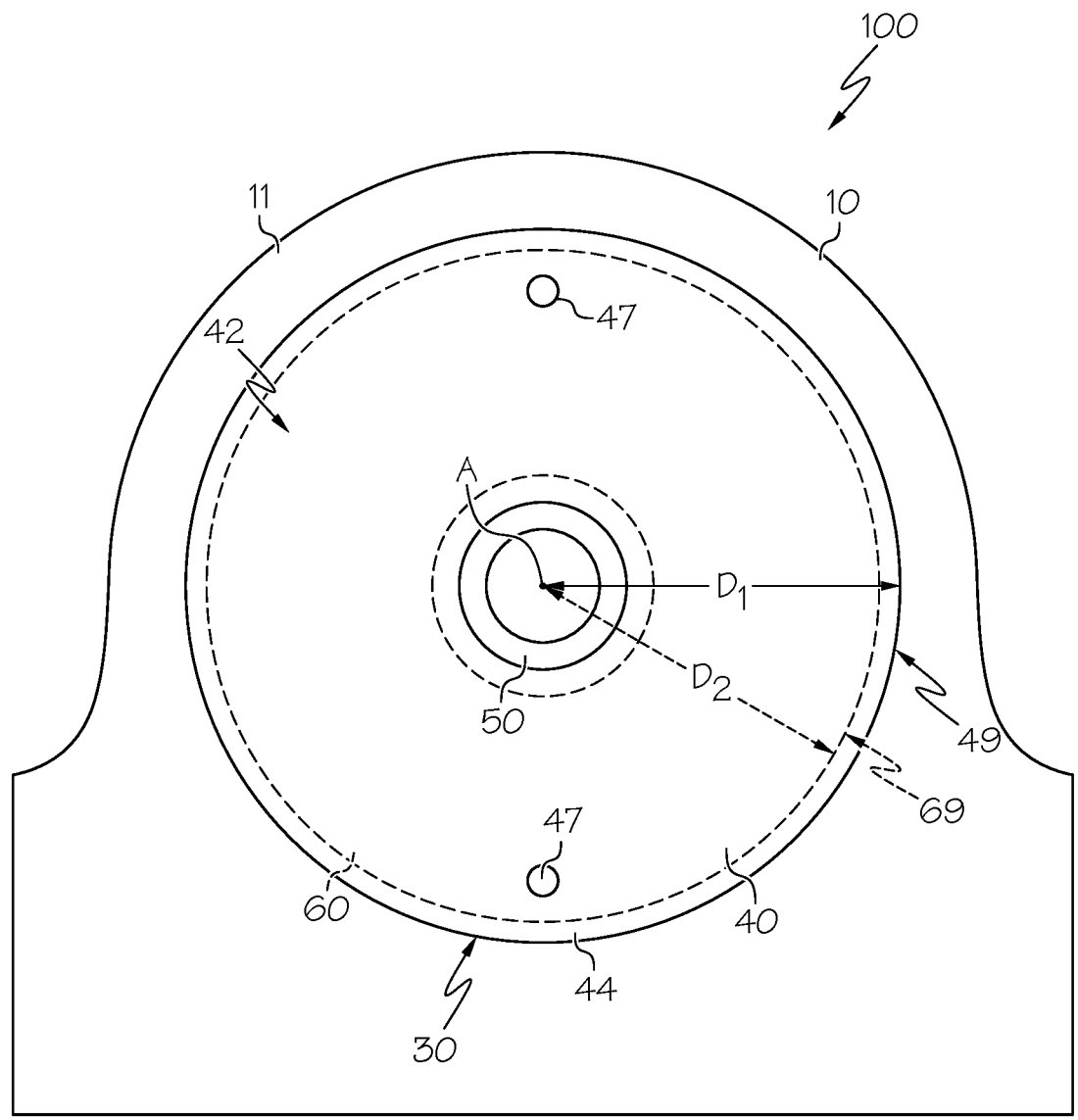
FIG. 3 is a side elevational view of the apparatus shown in FIG. 2.
Figure 4:
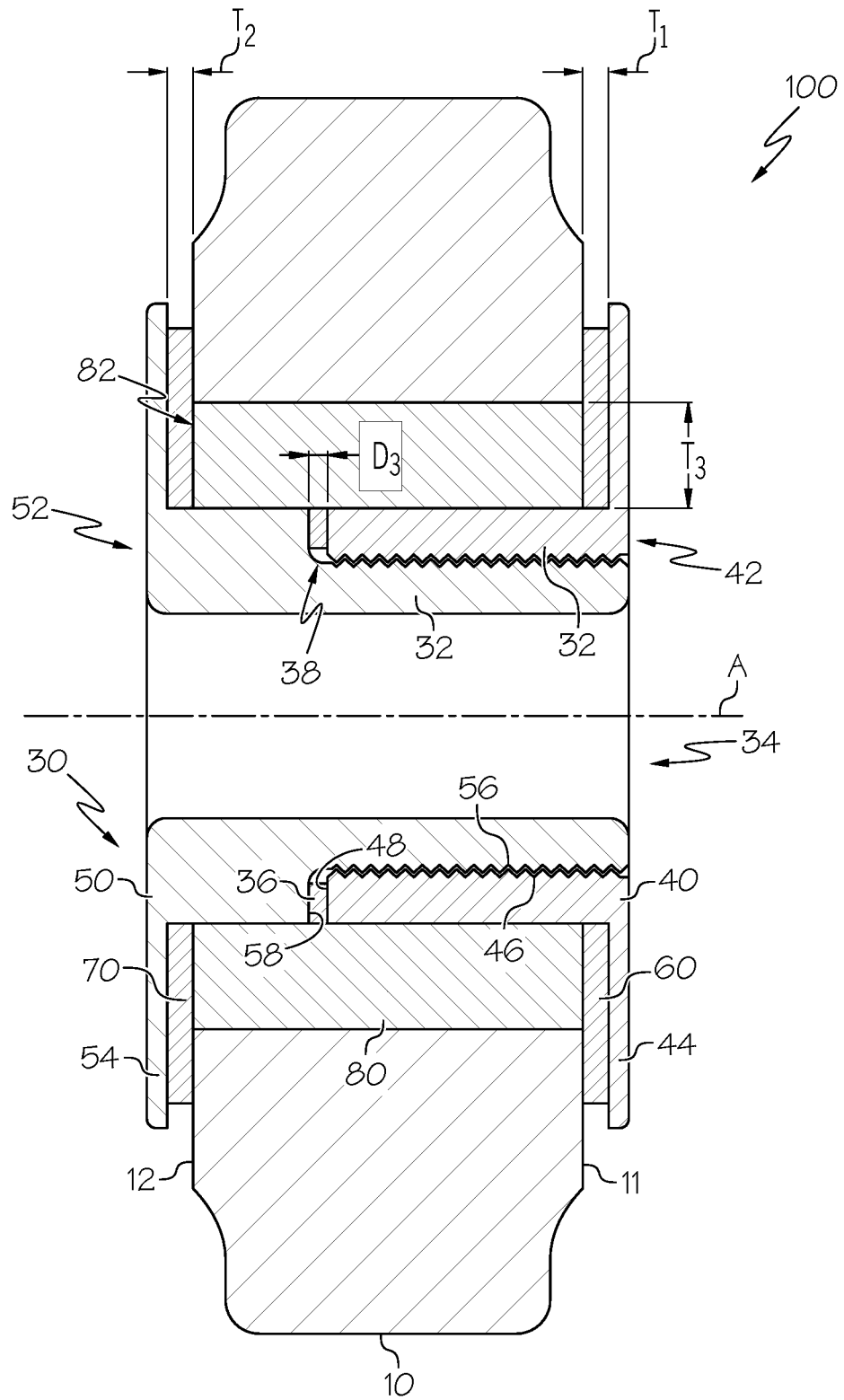
FIG. 4 is a front elevational view, in cross-section, of the apparatus shown in FIG. 2.

The first axial elastomeric member 60 is positionable between the first flange 44 and the first surface 11 of the first member 10. When positioned, the first flange 44 may provide a degree of protection to the first axial elastomeric member 60 from environmental factors such as radiation and oxygen exposure. Where relevant, the first flange 44 may also act as a seal in limiting or even preventing the first axial elastomeric member 60 from outgassing (e.g. releasing gas stored within). The degree to which the first flange 44 may protect and/or seal the first axial elastomeric member 60, however, is related to the size of the first axial elastomeric member 60 in relation to the first flange 44. Referring to FIG. 3, at every angle about the shaft through-bore axis A, a periphery 49 of the first flange 44 is located a first radial distance $D_1$ from the shaft through-bore axis A and a periphery 69 of the first axial elastomeric member 60 is located a second radial distance $D_2$ from the shaft through-bore axis A. As shown, the first radial distance $D_1$ is greater than the second radial distance $D_2$. In one example, the second radial distance $D_2$ may be at most about 95% of the first radial distance $D_1$. In another example, the second radial distance $D_2$ may be at most about 80% of the first radial distance $D_1$. In yet another example, the second radial distance $D_2$ may be at most about 65% of the first radial distance $D_1$. Those skilled in the art will appreciate that the first flange 44 may provide greater protection to the first axial elastomeric member 60 in examples where the second radial distance $D_2$ is less than the first radial distance $D_1$, than in examples where the second radial distance $D_2$ is greater than the first radial distance $D_1$.

Those skilled in the art will also appreciate that the second flange 54 may protect and/or seal the second axial elastomeric member 70 in the same way that the first flange 44 protects and/or seals the first axial elastomeric member 60. Similarly, the second flange 54 and the second axial elastomeric member 70 may also define peripheries (not shown) that are sized relative to one another in the same way as the first flange 44 and the first axial elastomeric member 60.

Figure 5:
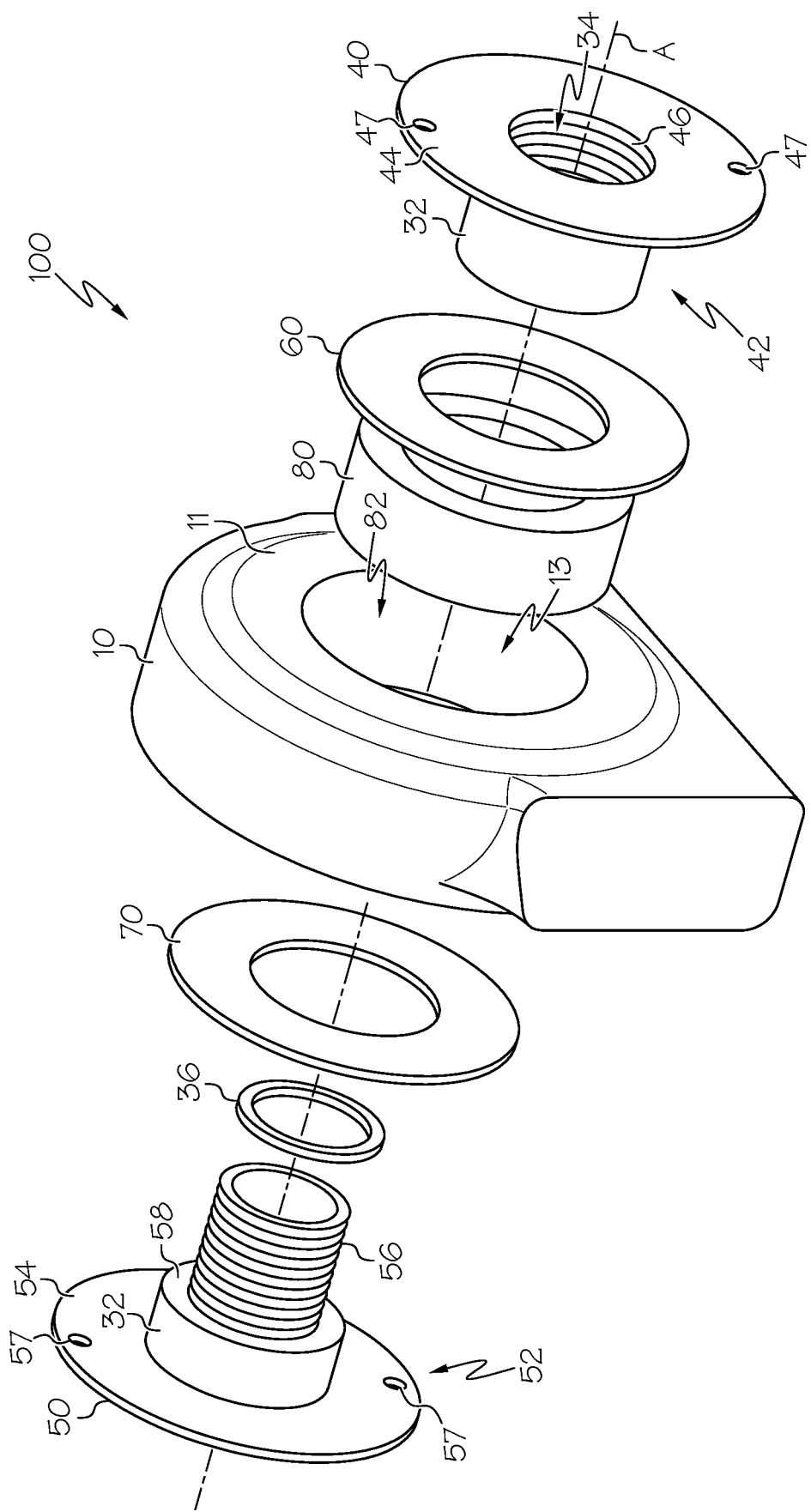
FIG. 5 is an exploded perspective view of the apparatus shown in FIG. 2.
Figure 6:
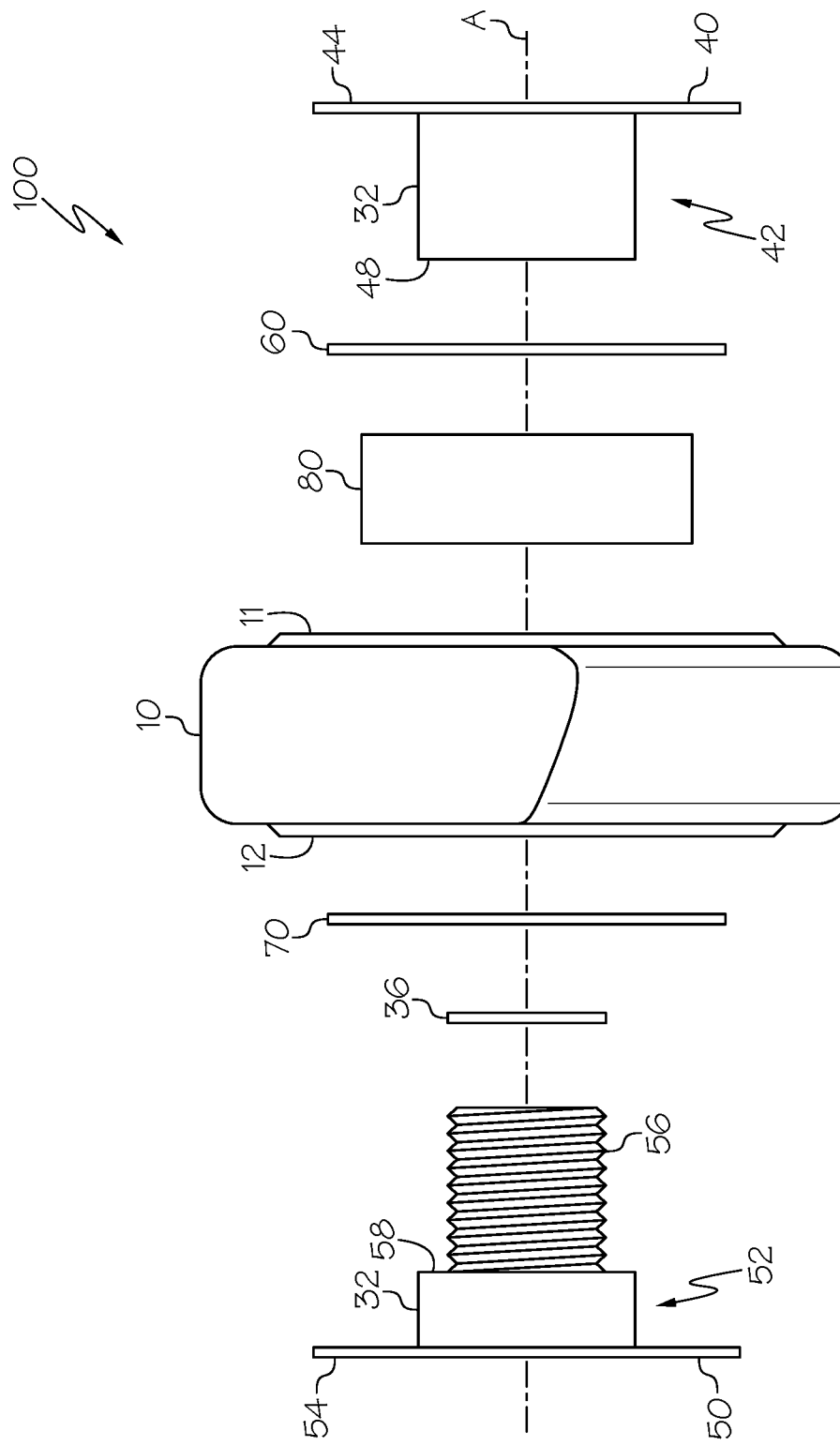
FIG. 6 is an exploded front view of the apparatus shown in FIG. 2.

As best shown in FIG. 5, the first axial elastomeric member 60 and the second axial elastomeric member 70 may be generally planar and annular in shape. Those skilled in the art will appreciate, however, that nonplanar axial elastomeric members having non-annular shapes, such as a polygonal or irregular shapes, may be employed without departing from the scope of the present disclosure. In addition to shape, the first axial elastomeric member 60 and the second axial elastomeric 70 may also vary in size. More specifically, the first axial elastomeric member 60 may have a thickness $T_1$ measured parallel to the shaft through-bore axis A and the second axial elastomeric member 70 may have a thickness $T_2$ measured parallel to the shaft through-bore axis A. In one example, $T_1$ may be substantially equal in thickness to $T_2$. In another example, $T_1$ may be about twice as thick as $T_2$. In yet another example, $T_1$ may be about half as thick as $T_2$. The thickness of $T_1$ relative to $T_2$ may be dictated primarily by end-use considerations and may vary widely without departing from the scope of the present disclosure. Further, the fact that the damping apparatus 100 can accommodate such variability enables the damping apparatus 100 to be more tailorable to any particular end-use application.

The radial elastomeric member 80 is positionable between the first member 10 and the receiving member 30. More specifically, the first member 10 and the shaft 32 of the receiving member 30 may define an annular space 82 therebetween and the radial elastomeric member 80 may be sized and shaped to substantially fill this annular space 82. Once positioned, the radial elastomeric member 80 may have a radial thickness $T_3$ measured perpendicular to the shaft through-bore axis A. Those skilled in the art will appreciate that $T_3$ may vary widely without departing from the scope of the present disclosure.

It is contemplated that additional axial and/or radial elastomeric members may be positioned proximate the first axial elastomeric member 60, the second elastomeric member 70 and the radial elastomeric member 80. Positioning multiple axial and/or radial elastomeric members may improve damping ability. In one example, two radial elastomeric members may be positioned within the first member through-bore 13 between the first member 10 and the shaft 32 of the receiving member 30. In another example, three axial elastomeric members may be positioned between the first flange 44 of the receiving member 30 and the first surface 11 of the first member 10. In yet another example, four axial elastomeric members may be positioned between the second flange 54 of the receiving member 30 and the second surface 12 of the first member 10. Those skilled in the art will appreciate that any combination of quantity and axial and/or radial elastomeric member positions may be employed without departing from the scope of the present disclosure.

At this point, those skilled in the art will appreciate that the first axial elastomeric member 60, the second axial elastomeric member 70 and the radial elastomeric member 80 (and any combination thereof) may independently or cooperatively damp the first member 10 relative to the second member 20. When a mechanical load is applied to either the first member 10 or the second member 20 (which transfers mechanical loads to and from the receiving member), the first member 10 and the second member 20 may move towards one another. When they do, at least one of the first axial elastomeric member 60, the second axial elastomeric member 70 and the radial elastomeric member 80 may compress in response (the first and second axial elastomeric members 60, 70 may compress between their respective flanges and surfaces of the first member 10, and the radial elastomeric member 80 may compress between the first member 10 and the shaft 32 of the receiving member 30), which thereby lessens the transfer of mechanical energy between the first and second members 10, 20. More specifically, the first and second axial elastomeric members 60, 70 may damp lateral movement (e.g., parallel to shaft through-bore axis A) of the first member 10 relative to the second member 20, and the radial elastomeric member 80 may damp radial movement (e.g., perpendicular to shaft through-bore axis A) of the first member 10 relative to the second member 20. Further, at least one of the first axial elastomeric member 60 and the second axial elastomeric member 70 may cooperate with the radial elastomeric member 80 in damping diagonal movement of the first member 10 relative to the second member 20.

The first axial elastomeric member 60, the second axial elastomeric member 70 and radial elastomeric member 80 may be made from any suitable elastomeric material and may be selected based on a variety of end-use considerations. For example, in applications taking place in space, it may be important to select elastomeric materials that exhibit high loss factor, compressive strength and stiffness, but low outgassing total mass loss. A suitable type of material for this application may include silicone-based elastomeric materials. It is generally contemplated, however, that the material compositions of the first axial elastomeric member 60, the second axial elastomeric member 70 and radial elastomeric member 80 may vary widely without departing from the scope of the present disclosure.

Different elastomeric materials may be used for each of the first axial elastomeric member 60, the second axial elastomeric member 70 and the radial elastomeric member 80. Those skilled in the art will appreciate that the ability to select different elastomeric materials for each of the first axial elastomeric member 60, the second axial elastomeric member 70 and radial elastomeric member 80 enables the damping apparatus 100 to be highly tailorable to any particular application. Further, the damping apparatus 100 may be used in conjunction with a plurality of interchangeable elastomeric members (not shown). These interchangeable elastomeric members may be interchangeable with at least one of the first axial elastomeric member 60, the second axial elastomeric member 70 and the radial elastomeric member 80. Each interchangeable elastomeric member of the plurality of interchangeable elastomeric members may also be compositionally distinct from at least one of the first axial elastomeric member 60, the second axial elastomeric member 70 and the radial elastomeric member 80. Those skilled in the art will appreciate that the interchangeability of the first axial elastomeric member 60, the second axial elastomeric member 70 and the radial elastomeric member 80 further improves the tailorability of the damping apparatus 100 because it allows the damping apparatus 100 to be tailored after it has been in use. Tailoring the damping apparatus 100 may be as simple as swapping out at least one of the first axial elastomeric member 60, the second axial elastomeric member 70 and radial elastomeric member 80 for an interchangeable elastomeric member.

Figure 7:
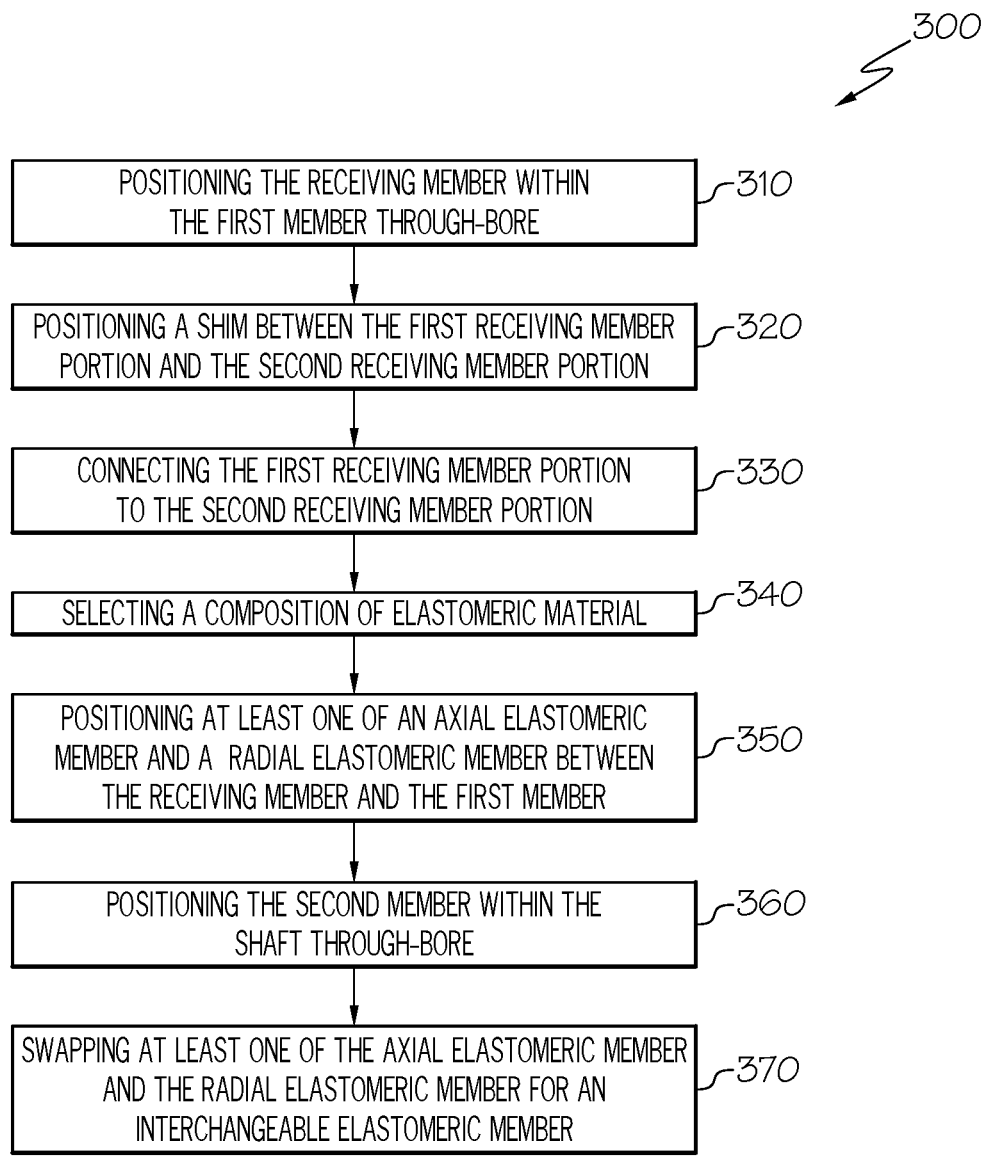
FIG. 7 is a flow diagram depicting an example of the disclosed method for damping a first member relative to a second member.

As shown in FIG. 7, disclosed is an example of a method 300 for damping a first member 10 relative to a second member 20. The size, shape and composition of the first member 10 and the second member 20 may vary. In one or more examples, however, the first member 10 may include a first surface 11, a second surface 12 opposed from the first surface 11, and a first member through-bore 13 extending between the first surface 11 and the second surface 12.

The method 300 includes positioning a receiving member 30 that includes a shaft through-bore 34 within the first member through-bore 13 (block 310). The positioning 310 may entail inserting the receiving member 30 into the first member through-bore 13 or assembling the first member 10 around the receiving member 30. This step may also vary depending on the type of receiving member 30 used. In examples where the receiving member 30 includes a first receiving member portion 40 and a second receiving member portion 50, the first and second receiving member portions 40, 50 may be positioned by inserting their corresponding portions of the receiving member shaft 32 into the first member through-bore 13.

Example methods 300 that include using a receiving member 30 that includes a first receiving member portion 40 and a second receiving member portion 50 may also include positioning a shim 36 between the first receiving member portion 40 and the second receiving member portion 50 (block 320). In doing so, the first and second receiving member portions 40, 50 may be spaced a predefined minimum distance $D_3$ apart, wherein the predefined minimum distance $D_3$ corresponds to the width of the shim 36. The shim 36 prevents the first and second receiving member portions 40, 50 from being tightened to the maximum extent possible, which thereby limits the degree to which the first axial elastomeric member 60 and the second axial elastomeric member 70 may be compressed between their respective surfaces of the first member 10 and a flanges of the receiving member 30 while the damping apparatus 100 is in use.

These examples may further include connecting the first receiving member portion 40 and the second receiving member portion 50 (block 330). The first and second receiving member portions 40, 50 may be connected by any suitable mechanism, such as by threads, adhesives, mechanical deformations and the like.

The method 300 may also include selecting (block 340) a composition of elastomeric material, such as the composition of the axial elastomeric member 60 and/or the composition of the radial elastomeric member 80. The selecting 340 may be based on end-use considerations such as at least one of an optimal damping loss factor, an optimal degree of outgassing, and optimal compression strength and an optimal stiffness required for a particular application. Those skilled in the art will appreciate that other considerations may be considered in selecting a composition of elastomeric material without departing from the scope of the present disclosure.

The method 300 further includes positioning at least one of an axial elastomeric member 60 and a radial elastomeric member 80 between the receiving member 30 and the first member 10 (block 350). The axial elastomeric member may be positioned between a flange 44 of the receiving member 30 and a surface 11 of the first member 10. The radial elastomeric member may be positioned between within the first member through-bore 13 between the first member 10 and the shaft 32 of the receiving member 30. The positioning 350 may also, however, include positioning multiple axial elastomeric members and/or multiple radial elastomeric members in those respective locations.

In one example, the positioning 310 of the receiving member may include positioning a receiving member 30 that includes a first flange 44, and the positioning 350 of the at least one elastomeric member may include positioning the elastomeric member between the first surface 11 of the first member 10 and the first flange 44 of the receiving member 30. In another example, the positioning 310 of the receiving member includes positioning a receiving member 30 that includes a second flange 54 and the positioning 350 of the at least one elastomeric member includes positioning an elastomeric member between the second surface 12 of the first member 10 and the second flange 54 of the receiving member 30.

The method 300 also includes positioning the second member 20 within the shaft through-bore 34 (block 360). The second member 20, as positioned, may extend entirely through the shaft through-bore 34 or partially through it. As shown, this step 360 may be as simple as inserting a bolt through the shaft through-bore 34 but, alternatively, it may also include the additional step of directly connecting the second member 20 to the receiving member 30, such as by threaded means or an adhesive.

The method 300 may include swapping at least one of the axial elastomeric member 60 and the radial elastomeric member 80 for an interchangeable elastomeric member (block 370). The interchangeable elastomeric member may be any axial or radial elastomeric member 60, 80 that was not immediately in use. Those skilled in the art will appreciate that blocks 340 and 370 may be performed together to better tailor the damping apparatus 100 to a particular application.

Figure 8:
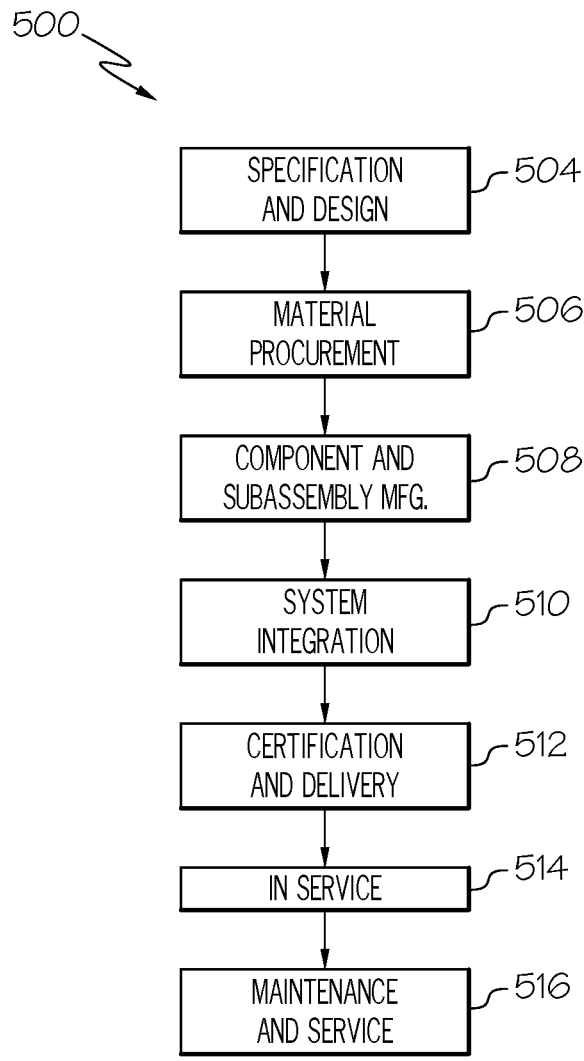
FIG. 8 is a flow diagram of an aircraft manufacturing and service methodology.
Figure 9:
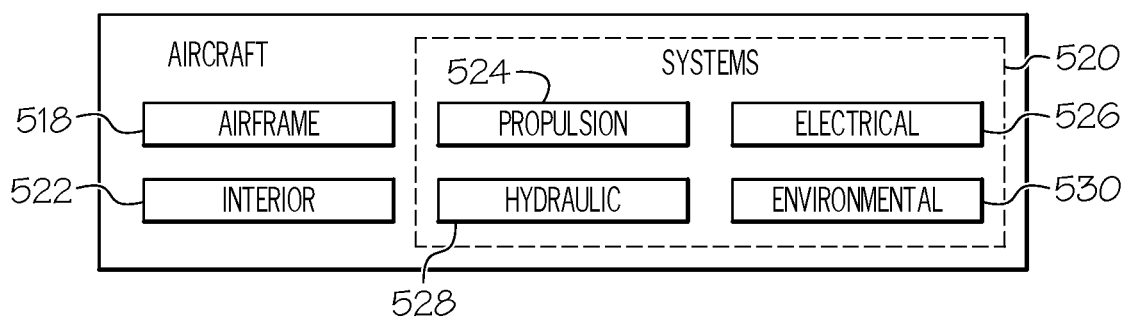
FIG. 9 is a block diagram of an aircraft.

Examples of the disclosure may be described in the context of an aircraft manufacturing and service method 500, as shown in FIG. 8, and an aircraft 502, as shown in FIG. 9. During pre-production, the aircraft manufacturing and service method 500 may include specification and design 504 of the aircraft 502 and material procurement 506. During production, component/subassembly manufacturing 508 and system integration 510 of the aircraft 502 takes place. Thereafter, the aircraft 502 may go through certification and delivery 512 in order to be placed in service 514. While in service by a customer, the aircraft 502 is scheduled for routine maintenance and service 516, which may also include modification, reconfiguration, refurbishment and the like.

Each of the processes of method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 9, the aircraft 502 produced by example method 500 may include an airframe 518 with a plurality of systems 520 and an interior 522. Examples of the plurality of systems 520 may include one or more of a propulsion system 524, an electrical system 526, a hydraulic system 528, and an environmental system 530. Any number of other systems may be included.

The disclosed apparatus, system and method for damping a first member relative to a second member may be employed during any one or more of the stages of the aircraft manufacturing and service method 500. As one example, the d disclosed apparatus, system and method for damping a first member relative to a second member may be employed during material procurement 506. As another example, components or subassemblies corresponding to component/subassembly manufacturing 508, system integration 510, and or maintenance and service 516 may be fabricated or manufactured using the disclosed apparatus, system and method for damping a first member relative to a second member. As another example, the airframe 518 and the interior 522 may be constructed using the disclosed apparatus, system and method for damping a first member relative to a second member. Also, one or more apparatus examples, method examples, or a combination thereof may be utilized during component/subassembly manufacturing 508 and/or system integration 510, for example, by substantially expediting assembly of or reducing the cost of an aircraft 502, such as the airframe 518 and/or the interior 522. Similarly, one or more of system examples, method examples, or a combination thereof may be utilized while the aircraft 502 is in service, for example and without limitation, to maintenance and service 516.

The disclosed apparatus, system and method for damping a first member relative to a second member are described in the context of an aircraft; however, one of ordinary skill in the art will readily recognize that the disc disclosed apparatus, system and method for damping a first member relative to a second member may be utilized for a variety of applications. For example, the disclosed apparatus, system and method for damping a first member relative to a second member may be implemented in various types of vehicles including, e.g., helicopters, passenger ships, automobiles and the like.

Although various examples of the disclosed apparatus, system and method for damping a first member relative to a second member have been shown and described, modifications may occur to those skilled in the art upon reading the specification. The present application includes such modifications and is limited only by the scope of the claims.

What is claimed is:

1. A damping apparatus for damping a first member relative to a second member, said damping apparatus comprising:
    a receiving member comprising a shaft and a flange that is coupled to said shaft, wherein said receiving member is configured to be coupled to said first member such that at least a portion of said shaft of said receiving member is positioned in a first member through-bore of said first member and said flange of said receiving member is aligned with a surface of said first member and said receiving member is configured to be coupled to said second member;
an axial elastomeric member that is separate from said receiving member, wherein said axial elastomeric member is positioned around said shaft of said receiving member such that said axial elastomeric member is positioned between said surface of said first member and said flange of said receiving member when said receiving member is coupled to said first member; and
a radial elastomeric member that is separate from said receiving member and said axial elastomeric member, wherein said radial elastomeric member is positioned around said shaft of said receiving member such that said radial elastomeric member is positioned between said first member and at least a portion of said shaft of said receiving member in said first member through-bore of said first member when said receiving member is coupled to said first member.

2. The damping apparatus of claim 1 further comprising a second axial elastomeric member that is separate from said receiving member, said axial elastomeric member, and said radial elastomeric member,
wherein:
said receiving member further comprises a second flange that is coupled to said shaft, opposite said flange; and
said second axial elastomeric member is positioned around said shaft of said receiving member, opposite said axial elastomeric member, such that said second axial elastomeric member is positioned between a second surface of said first member and said second flange of said receiving member when said receiving member is coupled to said first member.

3. The damping apparatus of claim 1 wherein said shaft of said receiving member comprises:
a shaft through-bore axis; and
a shaft through-bore that extends along said shaft through-bore axis,
wherein said shaft through-bore of said shaft of said receiving member is configured to receive a portion of said second member to couple said receiving member to said second member.

4. The damping apparatus of claim 3 wherein, at each angle about said shaft through-bore axis:
a periphery of said flange is located a first radial distance from said shaft through-bore axis;
a periphery of said axial elastomeric member is located a second radial distance from said shaft through-bore axis; and
said first radial distance is greater than said second radial distance.

5. The damping apparatus of claim 1 wherein said receiving member comprises a first receiving member portion and a second receiving member portion releasably connected to said first receiving member portion.

6. The damping apparatus of claim 1 wherein at least one of said axial elastomeric member and said radial elastomeric member comprises silicone.

7. A damping apparatus for damping a first member relative to a second member, said first member comprising a first surface, a second surface opposite first surface, and a first member through-bore extending between said first surface and said second surface, said damping apparatus comprising:

a receiving member configured to be coupled to said first member and said second member, wherein said receiving member comprises:
a shaft configured to extend through said first member through-bore of said first member when said receiving member is coupled to said first member, wherein said shaft comprises:
a shaft through-bore axis;
a shaft through-bore extending along said shaft through-bore axis and configured to receive a portion of said second member when said receiving member is coupled to said second member;
a first end portion; and
a second end portion opposite said first end portion along said shaft through-bore axis;
a first flange coupled to said shaft proximate said first end portion of said shaft, wherein said first flange is configured to be aligned with said first surface of said first member when said receiving member is coupled to said first member; and
a second flange coupled to said shaft proximate said second end portion of said shaft, wherein said second flange is configured to be aligned with said second surface of said second member when said receiving member is coupled to said first member;
a first axial elastomeric member that is separate from said receiving member, wherein said first axial elastomeric member is positioned around said shaft of said receiving member such that said first axial elastomeric member is positioned between said first surface of said first member and said first flange of said receiving member when said receiving member is coupled to said first member;
a second axial elastomeric member that is separate from said receiving member and said first axial elastomeric member, wherein said second axial elastomeric membrane is positioned around said shaft of said receiving member, opposite said first axial elastomeric member, such that said second axial elastomeric member is positioned between said second surface of said first member and said second flange of said receiving member when said receiving member is coupled to said first member; and
a radial elastomeric member that is separate from said receiving member, said first axial elastomeric member, and said second axial elastomeric membrane, wherein said radial elastomeric member is positioned around said shaft of said receiving member such that said radial elastomeric member is positioned between said first member and at least a portion of said shaft of said receiving member in said first member through-bore of said first member when said receiving member is coupled to said first member.

8. The damping apparatus of claim 7 wherein each of said first axial elastomeric member and said second axial elastomeric member has an annular shape.

9. The damping apparatus of claim 7 wherein, when said receiving member is coupled to said first member, an annular space is formed between said first member and said shaft of said receiving member, and wherein said radial elastomeric member is sized and shaped to substantially fill said annular space.

10. The damping apparatus of claim 7 wherein at least one of said first axial elastomeric member, said second axial elastomeric member and said radial elastomeric member comprises silicone.

11. The damping apparatus of claim 7 wherein at least one of said first flange and said second flange is integral with said shaft of said receiving member.

12. The damping apparatus of claim 7 wherein, at each angle about said shaft through-bore axis:
a periphery of said first flange is located a first radial distance from said shaft through-bore axis;
a periphery of said first axial elastomeric member is located a second radial distance from said shaft through-bore axis; and
said first radial distance is greater than said second radial distance.

13. The damping apparatus of claim 7 wherein, at each angle about said shaft through-bore axis:
a periphery of said first flange is located a first radial distance from said shaft through-bore axis;
a periphery of said first axial elastomeric member is located a second radial distance from said shaft through-bore axis; and
said second radial distance is at most about 95% of said first radial distance.

14. The damping apparatus of claim 7 wherein said receiving member comprises aluminum.

15. The damping apparatus of claim 7 wherein:
said receiving member comprises a first receiving member portion and a second receiving member portion releasably connected to said first receiving member portion;
said first receiving member portion comprises said first flange and a first portion of said shaft; and
said second receiving member portion comprises said second flange and a second portion of said shaft.

16. The damping apparatus of claim 15 wherein said first receiving member portion is threadedly coupled to said second receiving member portion.

17. The damping apparatus of claim 15 wherein, when said receiving member is coupled to said first member, a gap if formed between said first portion of said shaft of said first receiving member portion and said second portion of said shaft of said second receiving member portion, and said receiving member further comprises a shim at least partially received in said gap.

18. The damping apparatus of claim 15 wherein said first receiving member portion comprises a first torquing feature for rotating said first receiving member portion about said shaft through-bore axis.

19. The damping apparatus of claim 18 wherein said second receiving member portion comprises a second torquing feature for rotating said second receiving member portion about said shaft through-bore axis.

20. A method for damping a first member relative to a second member, said first member comprising a first surface, a second surface opposite said first surface, and a first member through-bore extending between said first surface and said second surface, said method comprising:
coupling a receiving member to said first member such that at least a portion of a shaft of said receiving member is positioned in said first member through-bore of said first member, a first flange of said receiving member, coupled to said shaft, is aligned with said first surface of said first member, and a second flange of said receiving member, coupled to said shaft opposite said first flange, is aligned with said second surface of said first member;
positioning an axial elastomeric member, which is separate from said receiving member and is positioned around said shaft of said receiving member, between said first surface of said first member and said first flange of said receiving member;
positioning a second axial elastomeric member, which is separate from said receiving member and said first axial elastomeric member and is positioned around said shaft of said receiving member opposite said axial elastomeric member, between said second surface of said first member and said second flange of said receiving member;
positioning a radial elastomeric member, which is separate from said receiving member, said first axial elastomeric member, and said second axial elastomeric member and is positioned around said shaft of said receiving member, between said first member and at least a portion of said shaft of said receiving member in said first member through-bore of said first member; and
coupling said receiving member to said second member such that a portion of said second member is received in a shaft through-bore of said shaft of said receiving member.

* * * * *